United States Patent Office 2,967,835
Patented Jan. 10, 1961

2,967,835
HYDROGENATION CATALYST

Eugene V. Hort, Westfield, N.J., assignor to General Aniline & Film Corporation, New York, N.Y., a corporation of Delaware No Drawing. Filed Aug. 1, 1957, Ser. No. 675,549

17 Claims. (Cl. 252—447)

This invention relates to a novel hydrogenation catalyst and to a process for producing same.

It is an object of this invention to provide a novel and improved hydrogenation catalyst. Other objects and advantages will appear as the description proceeds.

The attainment of the above objects is made possible by the instant invention which is based upon the discovery that when a liquid dispersion containing a copper compound and metallic palladium is treated with a reducing agent to precipitate metallic copper in situ on the palladium, a novel copper coated or treated palladium catalyst is obtained which may be employed advantageously in the catalytic hydrogenation of aliphatic and aromatic nitro compounds to the corresponding amines, compounds containing ethylenic unsaturation to the corresponding saturated compounds, and ketones and aldehydes to the corresponding alcohols, and especially advantageously in the catalytic selective, partial hydrogenation of compounds containing acetylenic unsaturation to the corresponding ethylenically unsaturated compounds.

Particularly advantageous results are obtained when carrying out a process for hydrogenating 1,4-butynediol to 1,4-butenediol, hereinafter referred to as, respectively, butynediol and butenediol, in the presence of such catalyst and more particularly a process for reducing butynediol to butenediol comprising treating butynediol with about 1 equivalent of hydrogen at about room temperature to 100° C. and about 1 to 20 atmospheres pressure in the presence of such catalyst. It has been found that the above described copper treated palladium catalysts are much more selective than palladium per se for the stepwise reduction of butynediol to butenediol while at the same time suppressing yield-reducing side reactions. The catalyst maintains its activity much longer, possibly because of the lowering of by-product formation and the poisoning produced thereby, and may accordingly be employed for an increased number of hydrogenation reactions. The maintenance of a high catalytic activity may also be due to an increased resistance to poisoning. The use of the above-described catalyst also enables the use of milder pressure conditions and, as distinguished from palladium catalysts per se, relatively elevated temperatures which accelerates the rate of reaction and facilitates control of the exothermic reaction. The above described process for hydrogenating butynediol to butenediol is disclosed and claimed in my co-pending application Serial No. 675,542. entitled, "Partial Hydrogenation of Butynediol," filed concurrently herewith.

In producing the above-described copper treated palladium catalysts, a liquid dispersion of a copper compound is first admixed with metallic palladium. The term "dispersion" as employed herein is inclusive of solutions and finely divided suspensions such as aqueous dispersions of hydrated copper oxides. Any copper compound or salt may be employed in the cuprous or cupric form which is a source of reducible copper. Optimum results are obtained with aqueous solutions, preferably in low concentrations ranging from about .02 to 2% by weight, although higher concentrations may be employed if desired. As examples of copper compounds which may be employed, there may be mentioned salts of strong acids such as copper sulfate, copper chloride, and copper nitrate, salts of weak acids such as copper cyanide, copper formate, copper acetate, and copper carbonate, and copper oxide. Aqueous solutions of salts of strong acids are preferably made slightly alkaline, prior to hydrogenation, as by addition of caustic soda or the like, whereby a dispersion of hydrated copper oxide is formed, which dispersion is then treated with a reducing agent in the presence of the metallic palladium. Aqueous solutions of readily soluble copper salts of weak acids need no adjustment of pH prior to reduction in the presence of the palladium. Copper carbonate and copper oxide are sparingly soluble and should preferably be dissolved in water in the presence of a small amount of weak acid such as acetic acid in forming the aqueous dispersion to be subjected to the action of a reducing agent in the presence of the metallic palladium.

The metallic palladium employed in making the catalyst employed herein may be in the form of finely divided particles of unsupported palladium, but in the interests of economy, ease of handling, improved results and the like, it is preferred to employ metallic palladium deposited on an inert carrier or support of known type, such as carbon, alumina, silica, and the like. Supported palladium catalysts may contain from about 1 to 20%, preferably about 2 to 10%, by weight of metallic palladium.

The metallic palladium particles may be of any suitable size distribution. A suitable supported palladium catalyst may, by way of example, be prepared by saturating charcoal or other support with an aqueous solution of palladium chloride, draining, drying and then igniting or heating in a reducing atmosphere such as hydrogen or the like.

An amount of liquid dispersion of the copper compound should be subjected to reduction in the presence of the metallic palladium sufficient to deposit for each part of palladium about 5 to 30 parts of copper. Higher proportions of copper are generally undesirable because of a corresponding lowering of catalytic hydrogenating activity, while lower proportions do not yield the desired amount of improvement in catalytic properties.

The treatment of such dispersion with a reducing agent in the presence of the metallic palladium may be carried out in known manner, preferably by hydrogenation at temperatures ranging from room temperature to about 100° C., and from about 1 to 20 atmospheres pressure. Instead of hydrogen, other known reducing agents may be employed such as hydrazine, hydroxylamine, and the like.

The resulting slurry containing the copper treated palladium catalyst may be filtered to separate the catalyst or may be directly employed as such for the liquid phase hydrogenation of butynediol or other reducible substances such as mentioned above.

The nature of the physical structure of the catalysts of the instant invention is not clearly understood, the copper treated, opaque black particles produced appearing under the microscope to closely resemble the untreated palladium particles. It is presumed that the instant products are particles of metallic palladium covered with a porous coating of copper and/or in contact with particles of copper. The following examples, in which parts are by weight unless otherwise indicated, are illustrative of the instant invention and are not to be regarded as limitative:

*Example 1*

Five grams of 5% palladium on charcoal (commercially available catalyst containing 5% palladium, 95% charcoal) are rocked for 1 hour in 100 g. of 5% aqueous copper acetate solution at 40° C. under 75 p.s.i.g. (pounds per square inch gauge) of hydrogen pressure. The resulting slurry containing the copper-treated palladium catalyst may be used as such in liquid phase hydrogenations, or filtered to separate the catalyst.

*Example II*

Five grams of 5% palladium on alumina (commercially available catalyst) is stirred at room temperature in 100 g. of 5% aqueous copper acetate to which 5 ml. of glacial acetic acid has been added.

To this mixture is added dropwise over 15 minutes with stirring 2 ml. of 85% aqueous hydrazine hydrate solution. The slurry is then stirred for 15 minutes additional, and filtered to separate the catalyst.

This invention has been disclosed with respect to certain preferred embodiments, and there will become obvious to persons skilled in the art various modifications, equivalents or variations thereof which are intended to be included within the spirit and scope of this invention.

I claim:

1. A process for producing a hydrogenation catalyst comprising treating an aqueous dispersion containing a copper compound and metallic palladium with a reducing agent to precipitate metallic copper in situ on the palladium.

2. A process as defined in claim 1 wherein the reducing agent is hydrogen.

3. A process as defined in claim 1 wherein the reducing agent is hydrazine.

4. A process for producing a hydrogenation catalyst comprising treating an aqueous solution containing a copper salt and metallic palladium with a reducing agent to precipitate metallic copper in situ on the palladium.

5. A process as defined in claim 4 wherein the reducing agent is hydrogen.

6. A process as defined in claim 4 wherein the reducing agent is hydrazine.

7. A process for producing a hydrogenation catalyst comprising treating an aqueous solution containing copper acetate and metallic palladium with a reducing agent to precipitate metallic copper in situ on the palladium.

8. A process as defined in claim 7 wherein the reducing agent is hydrogen.

9. A process as defined in claim 7 wherein the reducing agent is hydrazine.

10. A process for producing a hydrogenation catalyst comprising treating an aqueous dispersion containing a copper compound and metallic palladium on an inert solid carrier with a reducing agent to precipitate metallic copper in situ on the palladium.

11. A process as defined in claim 10 wherein the reducing agent is hydrogen.

12. A process as defined in claim 10 wherein the reducing agent is hydrazine.

13. A process for producing a hydrogenation catalyst comprising treating an aqueous dispersion containing a copper compound and metallic palladium on charcoal with a reducing agent to precipitate metallic copper in situ on the palladium.

14. A process as defined in claim 13 wherein the reducing agent is hydrogen.

15. A process for producing a hydrogenation catalyst comprising treating an aqueous dispersion containing a copper compound and metallic palladium on alumina with a reducing agent to precipitate metallic copper in situ on the palladium.

16. A process as defined in claim 15 wherein the reducing agent is hydrazine.

17. A catalyst comprising metallic palladium carrying metallic copper precipitated in situ thereon.

References Cited in the file of this patent

UNITED STATES PATENTS

| | | |
|---|---|---|
| 2,690,457 | Hackmann | Sept. 28, 1954 |
| 2,760,940 | Schwarzenbek | Aug. 28, 1956 |
| 2,847,475 | Voge | Aug. 12, 1958 |